United States Patent
Campbell et al.

(10) Patent No.: US 6,219,922 B1
(45) Date of Patent: *Apr. 24, 2001

(54) NOZZLE ASSEMBLY FOR A POWER TOOL

(75) Inventors: David C. Campbell, Bel Air; Gale A. Heslop, Carney; Lynn E. Lentino, Westminster, all of MD (US)

(73) Assignee: Black & Decker, Inc., Newark, DE (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/868,708

(22) Filed: Jun. 4, 1997

(51) Int. Cl.$^7$ ............................... B25F 3/00; B23D 45/16
(52) U.S. Cl. ............................. 30/124; 30/125; 30/390; 30/391
(58) Field of Search ............................. 30/124, 125, 134, 30/390, 391, 388; 451/456

(56) References Cited

U.S. PATENT DOCUMENTS

| | | |
|---|---|---|
| 1,845,882 | 2/1932 | Litschge . |
| 2,562,396 | 7/1951 | Schutz . |
| 2,926,709 | 3/1960 | Kaley . |
| 3,004,767 | 10/1961 | Greene et al. . |
| 3,628,812 | 12/1971 | Larralde et al. . |
| 3,882,598 * | 5/1975 | Earle et al. ............................. 30/390 |
| 4,150,598 | 4/1979 | Berends et al. . |
| 4,221,336 | 9/1980 | Diamond . |
| 4,222,753 | 9/1980 | Mills . |
| 4,368,598 * | 1/1983 | Kuhlmann ............................. 451/456 |
| 4,414,743 * | 11/1983 | Pioch et al. ............................. 30/390 |
| 4,440,372 | 4/1984 | Wisniewski . |
| 4,697,389 * | 10/1987 | Romine ............................. 451/456 |
| 5,023,999 | 6/1991 | Looper et al. . |
| 5,033,192 * | 7/1991 | Franz et al. ............................. 30/390 |
| 5,090,837 | 2/1992 | Mower . |
| 5,281,045 | 1/1994 | Ichikawa . |
| 5,327,649 | 7/1994 | Skinner . |
| 5,353,670 | 10/1994 | Metzger, Jr. . |
| 5,560,547 * | 10/1996 | Mutter et al. ............................. 451/456 |
| 5,562,005 | 10/1996 | Boyen et al. . |

* cited by examiner

Primary Examiner—M. Rachuba
Assistant Examiner—Sean Pryor
(74) Attorney, Agent, or Firm—Shook, Hardy & Bacon, L.L.P.

(57) ABSTRACT

A nozzle assembly for a power tool that generates dust includes a housing surrounding a portion of the power tool, an outlet section of the housing for accommodating the flow of dust away from the power tool and a conduit that is coupled with the outlet section to direct the flow of dust from the housing. During operation of the power tool, the conduit is rigidly coupled with the outlet section in an advanced position in which rotational movement of the conduit relative to the outlet section is impeded. The direction of dust flow out of the conduit may be selectively adjusted by transferring the assembly to a retracted position in which rotational movement of the conduit relative to the outlet section is substantially unimpeded. The outlet section and conduit may be tapered so that the advanced position is obtained through a friction fit. A preferred embodiment of the present invention further includes an arcuate channel disposed along the circumference of the conduit, a tab protruding from the housing and disposed within the channel to couple the conduit with the outlet section, a detent intermediate the channel and the inlet end of the conduit and a flexible collar intermediate the housing and the conduit. The nozzle assembly may also include a dust collection container coupled with the conduit.

20 Claims, 3 Drawing Sheets

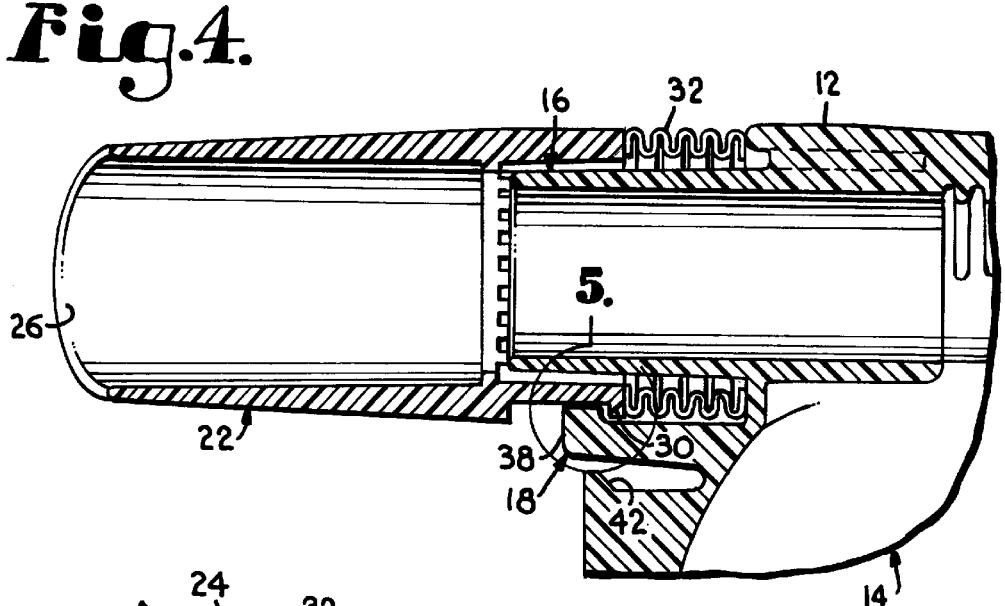
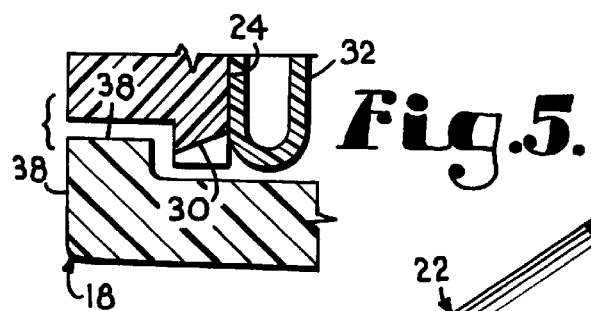
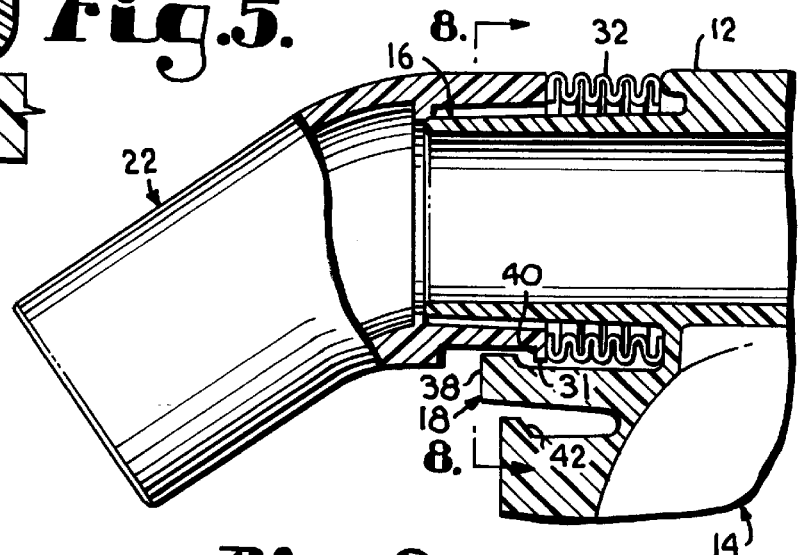
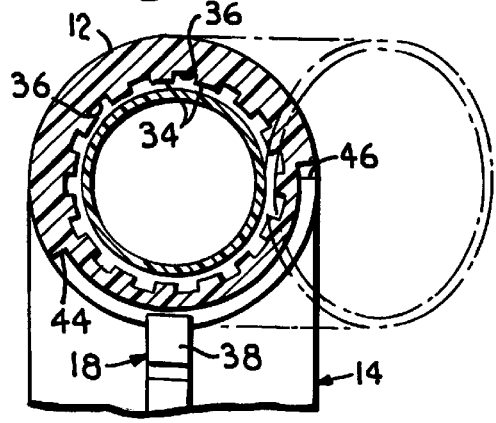
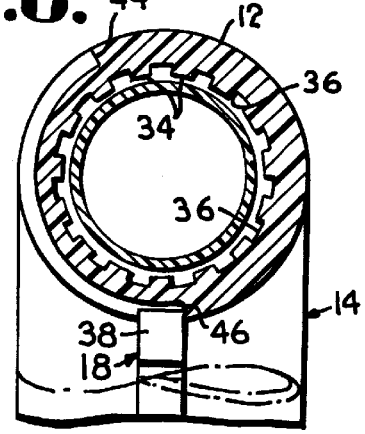

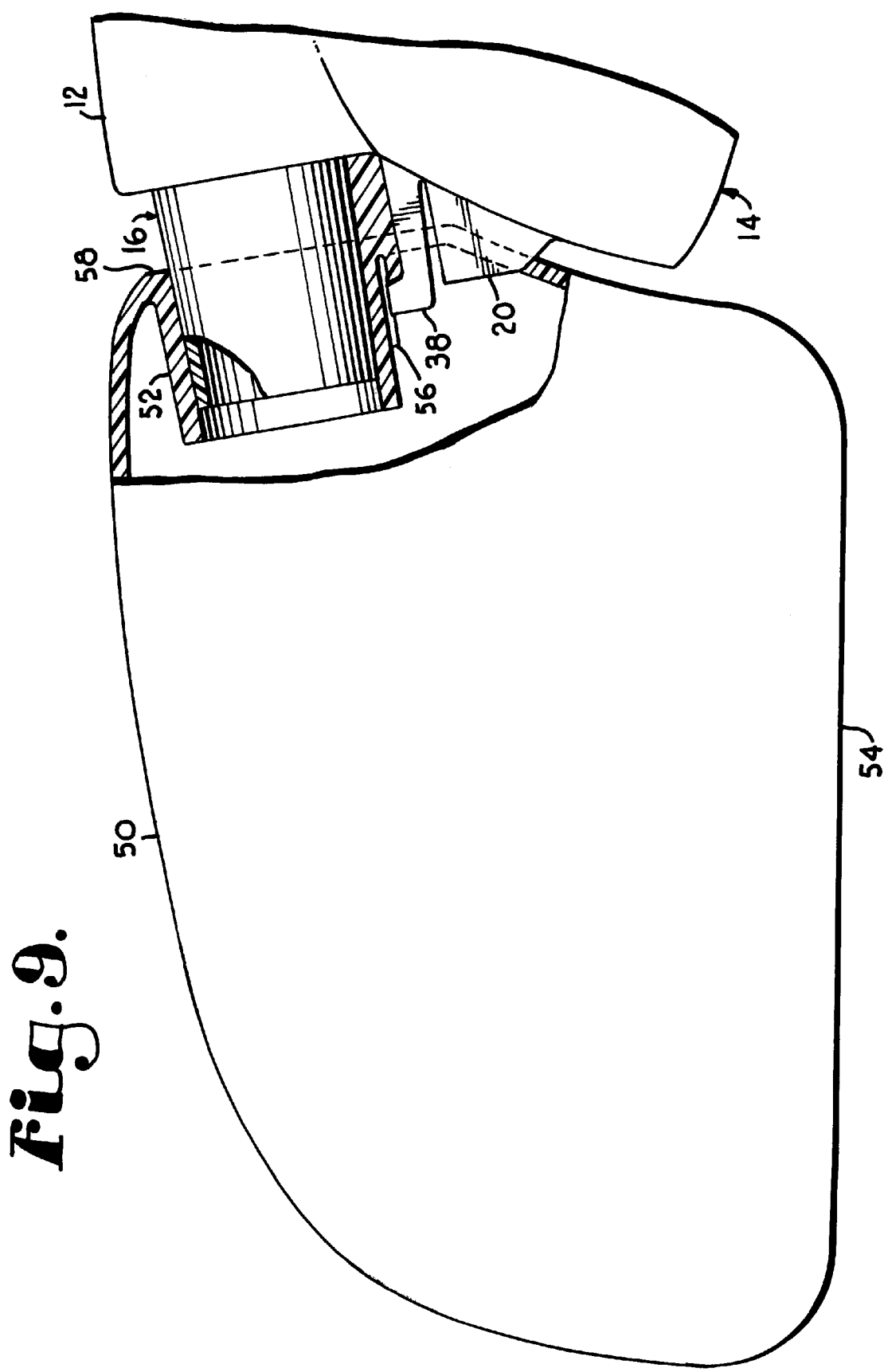

NOZZLE ASSEMBLY FOR A POWER TOOL

BACKGROUND OF THE INVENTION

This invention relates in general to a nozzle assembly for a power tool and, more particularly, to a nozzle assembly for selectively directing the flow of dust generated by a power tool such as a circular saw.

There are number of power tools that generate dust when they are being used. For example, the cutting action of a circular saw generates saw dust from cutting wood or from stone cutting of marble or concrete. Similarly, the operation of a sander or router creates dust.

It has been found that equipping such power tools with a nozzle or other dust collection device is desirable to divert the dust away from the work area so that it will not interfere with the operation of the tool. Moreover, without a nozzle or the like, the dust from the power tool will typically travel in all directions and cover a substantial portion of the floor surface.

One attempt to overcome these well-known problems associated with dust-generating power tools was to utilize a two-piece or clamshell housing configuration for the power tool wherein a socket was formed in the housing so that a dust nozzle disposed in the socket would swivel. An example of this construction is shown in U.S. Pat. No. 4,150,598 to Berends et al. One drawback to this construction is that the nozzle must be disposed in the socket before the two pieces of the clamshell housing are joined together. Another problem with such a device is that a swiveling nozzle is likely to move during operation of the power tool and spread the dust in various directions.

Another approach to collecting dust from a power tool is shown in U.S. Pat. No. 2,562,396 to Schutz, which discloses a spout coupled with the housing by a thumb screw. The rotational movement of the spout is limited by a flange that extends for only a portion of the distance around the interior of the spout. Although the spout may be selectively rotated from one fixed position to another, the use of a thumb screw to secure the spout to the housing is cumbersome and inconvenient. The operator must simultaneously handle the tool and the spout while adjusting the thumb screw. Moreover, the use of a thumb screw increases the number of parts and complicates the design of the dust collection apparatus.

One other type of dust collector for a power tool is described in U.S. Pat. No. 5,327,649 to Skinner. Skinner discloses a housing outlet that is connected to a vacuum source. Although the vacuum source is designed to remove dust from the work area, the use of a vacuum source is relatively expensive because it requires additional equipment.

Those skilled in the art would readily appreciate the problems noted above as well as other drawbacks to conventional devices for directing the flow of dust away from a power tool.

SUMMARY OF THE INVENTION

The present invention is directed to an improved nozzle assembly for a power tool that generates dust. The invention overcomes the problems and limitations set forth above by providing a cost effective assembly that permits selective rotational movement of the nozzle from one fixed position to another and eliminates the need for a clamshell housing. Furthermore, the invention provides a novel structure for coupling the nozzle with the power tool housing and a new structure for limiting the range of rotational movement of the nozzle relative to the housing.

Accordingly, it is an object of the present invention to provide a nozzle assembly for a power tool that may be conveniently transferred between an advanced position in which rotational movement of the nozzle relative to the housing is impeded and a retracted position in which rotational movement of the nozzle relative to the housing is unimpeded. A related object of the present invention is to provide a nozzle assembly wherein the nozzle is easily transferred between an advanced position and a retracted position so that the direction of dust flow out of the nozzle may be selectively adjusted.

It is another object of the present invention to provide a nozzle assembly wherein the housing outlet and the nozzle are tapered to permit a friction or press fit.

It is yet another object of the present invention to provide a nozzle assembly wherein the nozzle presents an arcuate channel along a portion of its outer circumference so that rotational movement of the nozzle relative to the housing is limited to a fraction of the possible rotational positions.

It is still another object of the present invention to provide a nozzle assembly having an arcuate channel disposed along the circumference of the nozzle and a tab protruding from the housing and disposed within the channel to couple the nozzle with the housing.

A further object of the present invention is to provide a nozzle assembly having a flexible collar disposed intermediate the housing and the nozzle to reduce dust contamination.

A still further object of the present invention is to provide a cost effective nozzle assembly wherein a dust canister may be coupled with the housing outlet in lieu of the nozzle. A related object of the present invention is to provide a nozzle assembly wherein a dust container may be coupled with the nozzle outlet.

These and other related objects of the present invention will become readily apparent upon further review of the specification and drawings. To accomplish the objects of the present invention, a nozzle assembly is provided that includes a housing surrounding at least a portion of the power tool, an outlet section protruding from the housing and a conduit coupled with the outlet section to direct the flow of dust from the housing, wherein the conduit may be coupled with the outlet section in an advanced position in which rotational movement of the conduit is impeded and in a retracted position in which rotational movement of the conduit is unimpeded so that the direction of dust flow out of the conduit may be selectively adjusted. In a preferred embodiment of the present invention, the nozzle assembly further includes an arcuate channel disposed along the circumference of the conduit and a tab protruding from the housing and disposed within the channel by clearing a detent in the conduit. The channel and tab cooperate to couple the conduit with the housing and permit selective rotational movement of the conduit relative to the housing. Preferably, the channel is disposed along only a portion of the outer circumference of the conduit to limit the movement of the tab and therefore limit the range of possible rotational positions of the conduit.

BRIEF DESCRIPTION OF THE DRAWINGS

In the accompanying drawings which form a part of the specification and are to be read in conjunction therewith and in which like reference numerals are used to indicate like parts in the various views:

FIG. 4 is a cross-sectional view taken along line 4—4 of FIG. 1 with the assembly in a retracted position;

FIG. 5 is an enlarged, fragmentary cross-sectional view of the nozzle assembly of the area in FIG. 4 indicated by the numeral 5;

FIG. 6 is a cross-sectional view similar to FIG. 4, with the assembly in an advanced position and the nozzle in a downwardly rotated position;

FIG. 7 is a cross-sectional view taken along line 7—7 of FIG. 2, with the outlet end of the nozzle shown in phantom lines in a side rotated position;

FIG. 8 is a cross-sectional view taken along line 8—8 of FIG. 6, with the outlet end of the nozzle shown in phantom lines in its fully downward position; and FIG. 9 is a fragmentary side elevation view of a dust canister coupled with the housing of the circular saw of FIG. 1 without the nozzle attached.

DETAILED DESCRIPTION OF THE DRAWINGS

Figure 1:
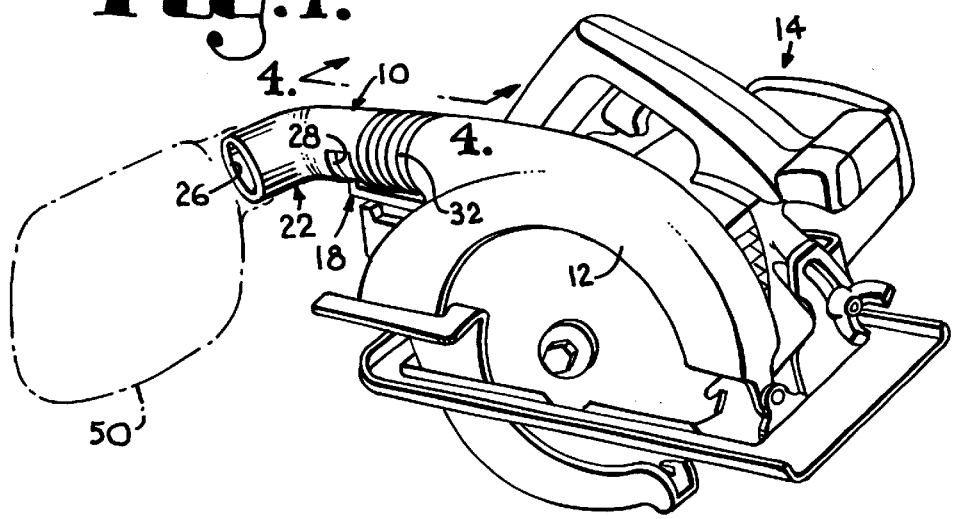
FIG. 1 is a perspective view of the nozzle assembly of the present invention coupled with a circular saw and showing a dust collection container in phantom lines.

Referring to the drawings in greater detail, and initially to FIG. 1, the nozzle assembly of the present invention is designated generally by reference numeral 10. The assembly 10 comprises a housing or upper guard 12 surrounding the upper periphery of a circular saw 14. The construction and operation of saw 14 is conventional and will not be described further herein.

Figure 3:
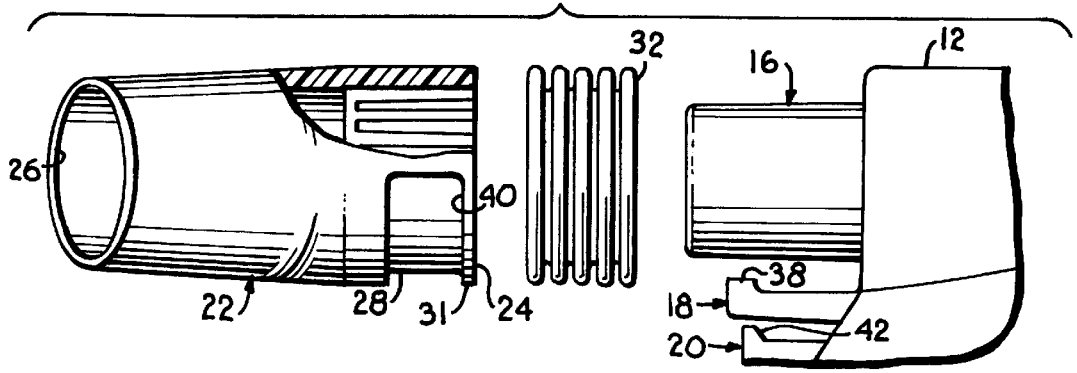
FIG. 3 is an enlarged, exploded side elevation view of the nozzle assembly of FIG. 2, parts being broken away and shown in cross-section to reveal details of construction.

With reference to FIG. 3, housing 12 differs from a conventional upper guard in that it presents an outlet section 16, an outwardly protruding tab 18 and a support wall 20. Assembly 10 further includes a nozzle or conduit 22 having an inlet end 24 and an outlet end 26. Outlet 16 and conduit 22 both have a generally circular cross-section and a tapered construction so that outlet 16 receives conduit 22 at inlet end 24 to effect a friction or press fit. Housing 12 and conduit 22 are preferably made of injection molded thermoplastic.

A structure for coupling conduit 22 with housing 12 includes tab 18 and a channel 28 extending along a portion of the outer circumference of conduit 22 near inlet end 24. A detent or notch 30 (shown in FIGS. 4 and 5) is located on ridge 31 intermediate channel 28 and end 24. Preferably, a corrugated collar or bellows 32 is disposed on outlet 16 between housing 12 and conduit 22. To reduce dust contamination, flexible collar 32 contracts as conduit 22 is advanced along outlet 16 and expands as conduit 22 is retracted therefrom. It has been found that collar 32 may be made from a flexible rubber compound.

Referring also to FIGS. 7 and 8, the interior surface of conduit 22 preferably includes a plurality of longitudinal ribs 34 extending inwardly from the inlet end 24 and circumferentially spaced apart from one another. Ribs 34 define a plurality of corresponding channels 36 that preferably extend from the outlet end 24 to a point near the middle of conduit 22 at which the conduit curves in the direction of outlet end 26.

Figure 2:
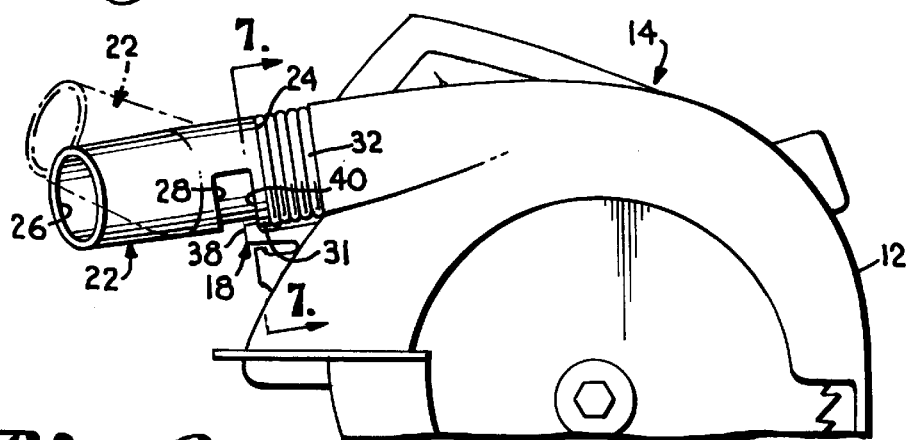
FIG. 2 is a fragmentary, side elevation view of the nozzle assembly of FIG. 1 coupled with a circular saw in a retracted position and with phantom lines indicating the nozzle in a rotated position.

As shown in FIGS. 2 and 4, assembly 10 may be disposed in a retracted position in which conduit 22 may be rotated about outlet 16. Despite some friction between conduit 22 and outlet 16, rotational movement is substantially unimpeded. Alternatively, the conduit 22 could be fully retracted from outlet 16 so that no friction is encountered when the conduit is rotated. As shown in FIG. 2, the conduit remains coupled with section 16 because head 38 of tab 18 is disposed in channel 28 and abuts a wall 40 formed by channel 28 and ridge 31 near inlet end 24. However, when detent 30 is aligned with head 38 as shown in FIGS. 4 and 5, tab 18 will clear detent 30 if conduit 22 is retracted with sufficient force. Likewise, tab 18 is disposed within channel 28 by clearing detent 30 as conduit 22 is first advanced onto outlet 16.

Tab 18 is deflected downwardly toward support wall 20 as it clears detent 30. To avoid undue stress on tab 18, support wall 20, which also protrudes outwardly from housing 12, presents a tip 42 that prevents excessive downward deflection of tab 18 as best shown in FIG. 6. Otherwise, in response to excessive downward deflection, tab 18 might either yield or break off of housing 12 thus preventing a snap fit between nozzle 22 and outlet 16.

Once tab 18 has cleared detent 30 and is disposed within channel 28, conduit 22 may be advanced along section 16 until a press fit is obtained. As shown in FIG. 6, head 38 of tab 18 will be disposed in channel 28 away from ridge 31 when assembly 10 is in a press fit or advanced position in which rotational movement of conduit 22 with respect to housing 12 is substantially impeded. Flexible collar 32 is compressed between housing 12 and inlet end 24 of conduit 22 when assembly 10 is in an advanced position. Those skilled in the art will recognize that there may be more than one advanced position for assembly 10 depending on the amount of axial force applied.

In operation, conduit 22 is readily transferred between the advanced position of FIG. 6 and the extended position shown in FIG. 4 by manually retracting and advancing conduit 22 along outlet section 16. In the preferred embodiment of the present invention, head 38 of tab 18 and wall 40 prevent the complete removal of conduit 22 from outlet 16 unless head 38 is aligned with detent 30. Even if detent 30 and tab 18 are so aligned, a substantial pulling force must be exerted on conduit 22 in order for tab 18 to clear detent 30. As shown in FIG. 5, detent 30 is inclined at inlet end 24 so that a substantial but lesser pushing force must be applied to conduit 22 as it is advanced over outlet section 16 to clear detent 30 and dispose head 38 within channel 28.

Although channel 28 may extend around the entire circumference of conduit 22, channel 28 may also be limited to a portion of the circumference of conduit 22 if limited rotational movement is desired. As shown in FIGS. 7 and 8, channel 28 extends along a fraction of the outer circumference of conduit 22. For most applications of a circular saw, it has been found that a channel extending approximately 90 to 180 degrees along the outer circumference of the conduit is desirable and the presently preferred channel will extend 135 to 180 degrees. When channel 28 extends along only a portion of the circumference of conduit 22, tab 18 may be rotated between a first radial position at one end 44 of channel 28 and a second radial position at the other end 46 ( as shown in FIG. 8) provided assembly 10 is in a retracted position. Moreover, nozzle 22 may be rotated to any one of a plurality of radial positions located between the ends 44, 46 of channel 28 (as shown in FIG. 7).

Nozzle 22 is quickly and conveniently adjustable between a plurality of radial positions by simply pulling on nozzle 22 to release the friction fit, thereby placing assembly 10 in a retracted position in which nozzle 22 is freely rotatable about outlet 16. After nozzle 22 is rotated to the desired radial position, nozzle 22 is simply pushed along outlet 16 toward housing 12 until it achieves a press fit. To adjust nozzle 22 again, these same steps are merely repeated.

During operation of the power tool, dust may accumulate within the tapered connection between nozzle 22 and outlet 16. Consequently, ribs 34 and channels 36 preferably form sharp corners so that the rotational movement of nozzle 22 in a retracted position will agitate or scrape off the dust that may have become trapped in the tapered connection. Accordingly, frequent rotational movement of nozzle 22 will loosen the dust and prevent dust contamination due to the construction of ribs 34.

The present invention also contemplates the use of a dust canister 50 shown in FIG. 9. Canister 50, which may be disposed on outlet 16 in lieu of nozzle 22, comprises a conduit 52 that is integrally coupled with a dust bag or container 54. Conduit 52 presents a channel 56 similar to channel 28 of nozzle 22 in that it cooperates with tab 18 to snap canister 50 into place. The support wall 20 may be utilized with canister 50 to prevent rotational movement of the canister. For example, if canister 50 is press fit onto outlet 16 and resting against wall 20, the canister cannot rotate toward wall 20. Further, canister 50 may be designed to limit rotation in the opposite direction by presenting a protrusion or wall (not shown) in channel 56. The presently preferred maximum range of rotation for canister 50 is 22 degrees.

As with nozzle 22, conduit 52 presents an inlet end 58 which mates with outlet section 16 to prevent the escape of dust from the canister. However, the outlet end of conduit 52 is integral with dust bag 54. Preferably, canister 50 is made of a cloth-type material and has a plastic frame. Flexible collar 32 may be disposed intermediate housing 12 and canister 50.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, we claim:

1. A nozzle assembly for a power tool that generates dust, said assembly comprising:
    a housing that surrounds at least a portion of the power tool;
    an outlet section protruding outwardly from said housing, wherein dust generated by the power tool flows out of said housing through said outlet section;
    a conduit having an inlet end coupled with said outlet section and an outlet end which directs the flow of dust from said housing, the inlet end having a central axis and the outlet end having a central axis, and wherein the central axis of the inlet end and the central axis of the outlet end are not coaxial, wherein said conduit further includes a plurality of longitudinal ribs extending inwardly from the inlet end toward the outlet end on an interior surface thereof;
    wherein said outlet section receives the inlet end of said conduit in an advanced position in which rotational movement of said conduit relative to said outlet section is substantially impeded; and
    wherein said conduit is moveable between the advanced position and retracted position in which rotational movement of said conduit relative to said outlet section is substantially unimpeded so that the direction of dust flow out of the outlet end of said conduit may be selectively adjusted.

2. The nozzle assembly of claim 1, wherein said outlet section and said conduit are tapered so that the inlet end of said conduit is slidingly received by said outlet section.

3. The nozzle assembly of claim 2, wherein the advanced position is achieved through a friction fit between said conduit and said outlet section.

4. The nozzle assembly of claim 3, wherein said outlet section is disposed inside said conduit.

5. The nozzle assembly of claim 1, further comprising means for limiting the rotational movement of said conduit relative to said outlet section.

6. The nozzle assembly of claim 1, further comprising a flexible collar disposed intermediate said housing and said conduit.

7. The nozzle assembly of claim 1, further comprising means for coupling the inlet end of said conduit with said outlet section in the retracted position.

8. The nozzle assembly of claim 1, wherein the power tool is a circular saw.

9. The nozzle assembly of claim 1, wherein the inlet end of said conduit is coupled with said outlet section in the retracted position.

10. The nozzle assembly of claim 1, wherein both said conduit and said outlet section have a generally circular cross-section.

11. A nozzle assembly for a power tool that generates dust, said assembly comprising:
    a housing that surrounds at least a portion of the power tool;
    an outlet section protruding outwardly from said housing, wherein dust generated by the power tool flows out of said housing through said outlet section;
    a conduit having an inlet end coupled with said outlet section and an outlet end which directs the flow of dust from said housing;
    an arcuate groove located only in an exterior surface of said conduit, the groove being along the circumference of said conduit near the inlet end, and wherein said conduit includes a detent intermediate said groove and the inlet end; and
    a tab protruding outwardly from said housing in proximity to said outlet section, wherein said tab becomes disposed within said groove upon clearing the detent so that said tab couples said conduit with said outlet section.

12. The nozzle assembly of claim 11, wherein said channel and said tab limit the rotational movement of said conduit relative to said outlet section.

13. The nozzle assembly of claim 11, further comprising a flexible collar disposed intermediate said housing and said conduit.

14. The nozzle assembly of claim 11, further comprising a support wall protruding outwardly from said housing in proximity to said tab to limit deflection of said tab as it clears the detent.

15. The nozzle assembly of claim 11, further comprising a dust container coupled with said conduit.

16. The nozzle assembly of claim 15, wherein the dust container is integral with said conduit.

17. A nozzle assembly for a power tool that generates dust, said assembly comprising:

- a housing that surrounds at least a portion of the power tool;
- an outlet section protruding outwardly from said housing, wherein dust generated by the power tool flows out of said housing through said outlet section;
- a conduit having an inlet end coupled with said outlet section and an outlet end which directs the flow of dust from said housing, said conduit having an interior surface and an exterior surface;
- an arcuate groove disposed along a portion of the circumference of said conduit on the exterior surface near the inlet end, wherein said groove extends from a first radial position on said conduit to a second radial position on said conduit; and
- a tab protruding outwardly from said housing in proximity to said outlet section, wherein said tab is received within said groove and is moveable between the first and second radial positions, wherein at least a portion of said tab overhangs at least a portion of the exterior surface of the conduit, and wherein said portion is received in said groove.

18. The nozzle assembly of claim 17, wherein said channel includes a third radial position on said conduit intermediate the first and second radial positions.

19. The nozzle assembly of claim 17, wherein the first and second radial positions are located from 90 to 180 degrees apart from one another.

20. The nozzle assembly of claim 17, further comprising a flexible collar disposed intermediate said housing and said conduit.

* * * * *